(12) United States Patent
Qin et al.

(10) Patent No.: US 9,236,936 B2
(45) Date of Patent: Jan. 12, 2016

(54) SYSTEM AND METHOD FOR LOW-COMPLEXITY, HIGH-SPEED PREPROCESSING OF ENCAPSULATED PACKETS IN A BROADBAND COMMUNICATIONS NETWORK

(75) Inventors: Liming Qin, Gaithersburg, MD (US); Alexei Duhovich, Frederick, MD (US); Chetan Tekur, San Mateo, CA (US)

(73) Assignee: Hughes Network Systems, LLC, Germantown, MD (US)

( * ) Notice: Subject to any disclaimer, the term of this patent is extended or adjusted under 35 U.S.C. 154(b) by 207 days.

(21) Appl. No.: 13/601,643

(22) Filed: Aug. 31, 2012

(65) Prior Publication Data

US 2014/0064280 A1      Mar. 6, 2014

(51) Int. Cl.
*H04L 12/56*      (2006.01)
*H04B 7/185*      (2006.01)

(52) U.S. Cl.
CPC ........ *H04B 7/18582* (2013.01); *H04L 2212/00* (2013.01)

(58) Field of Classification Search
CPC ...... H04L 12/28; H04W 28/04; H04W 28/06; H04W 84/06; H04W 28/065; H04W 12/06
USPC .......... 370/392, 338, 256, 315; 709/218, 223, 709/201, 250; 714/746, 755
See application file for complete search history.

(56) References Cited

U.S. PATENT DOCUMENTS

| | | | |
|---|---|---|---|
| 6,765,931 B1 * | 7/2004 | Rabenko et al. | 370/493 |
| 7,499,458 B2 * | 3/2009 | McDysan et al. | 370/396 |
| 2002/0004842 A1 * | 1/2002 | Ghose et al. | 709/235 |
| 2003/0123481 A1 * | 7/2003 | Neale et al. | 370/466 |
| 2004/0024903 A1 * | 2/2004 | Costatino et al. | 709/238 |
| 2004/0095928 A1 * | 5/2004 | O'Neill et al. | 370/389 |
| 2004/0177106 A1 * | 9/2004 | Rose et al. | 709/200 |
| 2004/0177275 A1 * | 9/2004 | Rose et al. | 713/201 |
| 2004/0184453 A1 * | 9/2004 | Moriwaki | 370/389 |
| 2008/0049621 A1 * | 2/2008 | McGuire et al. | 370/236.2 |
| 2008/0159264 A1 * | 7/2008 | Fleming | 370/352 |
| 2008/0225778 A1 * | 9/2008 | Vare et al. | 370/328 |

(Continued)

OTHER PUBLICATIONS

European Telecommunications Standards Institute publications: ETSI TS 102 606 V1.1.1 (Oct. 2007), "Digital Video Broadcasting (DVB); Generic Stream Encapsulation (GSE) Protocol;", published Jun. 2, 2012.*

(Continued)

*Primary Examiner* — Parth Patel
(74) *Attorney, Agent, or Firm* — Potomac Technology Law, LLC

(57) ABSTRACT

Systems and methods for performing preprocessing of received data packets, to reduce processing burdens and improve efficiency of communications terminal receivers, are provided. A first stage filter receives a data frame comprising data packets representing respective encapsulated fragments of a PDU. The first stage filter parses a header of one of the packets to locate a start field, and determines whether the start field indicates that the packet comprises a start fragment of the PDU. When the start field indicates that the packet comprises the start fragment, the first stage filter determines, based on packet label information of the packet header, whether to forward the packet to a second stage filter or to discard the packet, and forwards or discards the packet accordingly. When the start field indicates that the packet does not comprise the start fragment, the first stage filter forwards the packet to the second stage filter.

23 Claims, 12 Drawing Sheets

(56) References Cited

U.S. PATENT DOCUMENTS

| | | | |
|---|---|---|---|
| 2009/0310485 A1* | 12/2009 | Averi et al. | 370/232 |
| 2010/0039942 A1* | 2/2010 | Nakatsuji et al. | 370/241 |
| 2011/0069711 A1* | 3/2011 | Jha et al. | 370/395.53 |

OTHER PUBLICATIONS

Esti, "Digital Video Broadcasting (DVB); Second generation framing structure, channel coding and modulation systems for Broadcasting, Interactive Services, News Gathering and other broadband satellite applications (DBV-S2)", Aug. 2009, pp. 1-78, V1.21, European Broadcasting Union, France.

Etsi, "Digital Video Broadcasting (DBV); Generic Stream Encapsulation (GSE) implementation guidelines", Jun. 2009, pp. 1-34, V1.1.1, European Broadcasting Union, France.

Etsi, "Digital Video Broadcasting (DVB); Generic Stream Encapsulation (GSE) Protocol", Oct. 2007, pp. 1-25, V1.1.1, European Broadcasting Union, France.

* cited by examiner

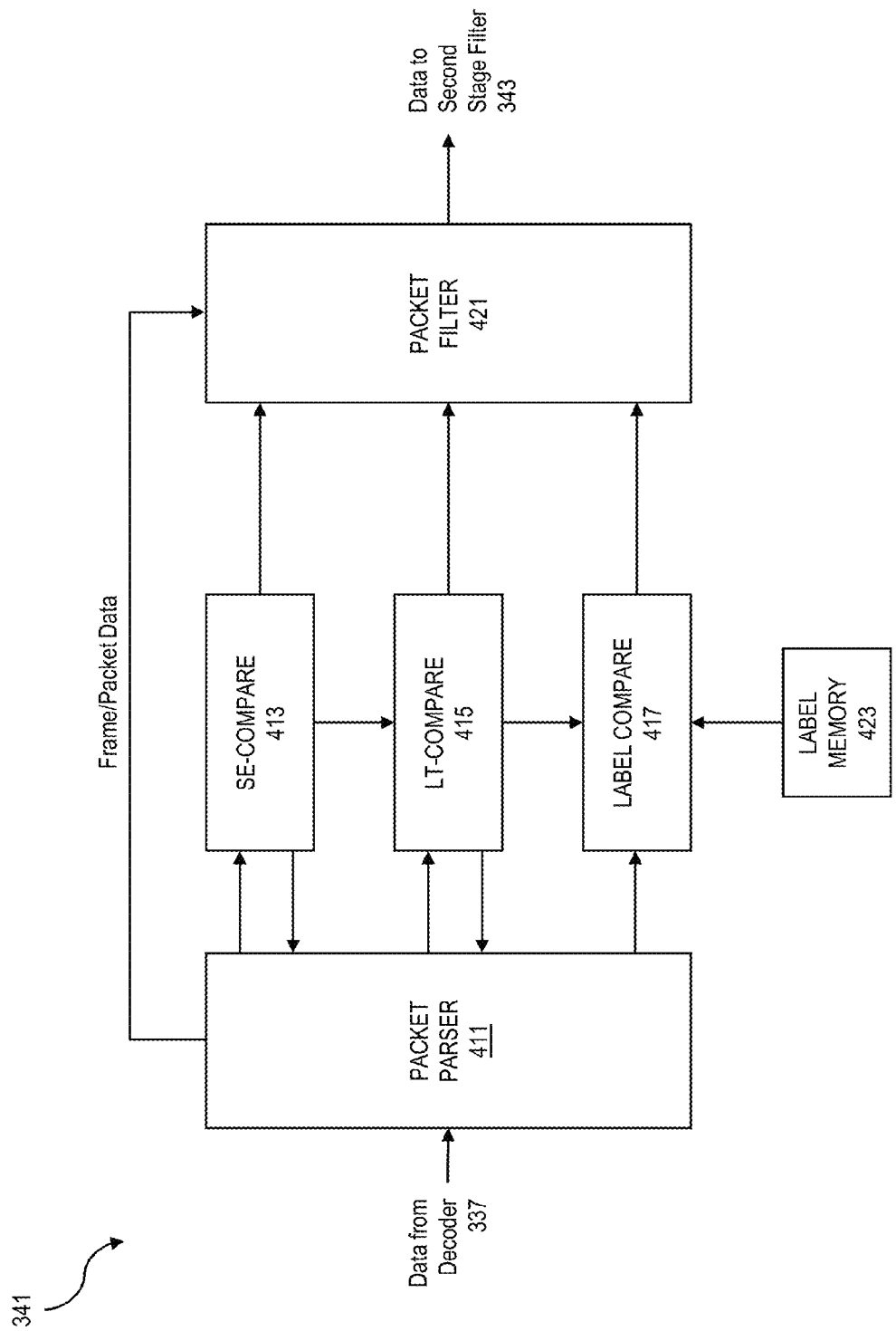

SYSTEM AND METHOD FOR LOW-COMPLEXITY, HIGH-SPEED PREPROCESSING OF ENCAPSULATED PACKETS IN A BROADBAND COMMUNICATIONS NETWORK

BACKGROUND

Communications system networks employ various protocol levels, including encapsulation protocols. The OSI model includes seven independent protocol layers, introduced in further detail below. Generic Stream Encapsulation (GSE) provides a data link layer protocol, which facilitates the transmission of data from packet oriented protocols (e.g., Internet protocol or IP) on top of a unidirectional physical layer protocol (e.g., DVB-S2, DVB-T2 and DVB-C2). With regard to such encapsulation protocols, network terminal nodes must decode or de-encapsulate such data packets to determine which data packets are intended of destined for that particular terminal. Accordingly, in typical systems, a software filter is implemented in each terminal node, which is configured to process the header information of each and every packet to determine the particular packets that are destined for that terminal. In view of the fact that a system may include a large number of terminal nodes (many tens or hundreds of thousands, or even millions), and a substantial amount of data traffic traverses such networks, any given terminal node would be burdened with the processing of a substantial number of data packets not even destined for that terminal. Accordingly, this burden of processing such a large volume of data packets via a software filter results in a significant amount of wasted processing power and bandwidth usage, as well as significant unnecessary time delays.

What is needed, therefore, are systems and methods for performing an initial high-speed, low complexity pre-processing of received data packets to reduce the processing burdens of the customary software packet filters of terminal node receivers.

SOME EXEMPLARY EMBODIMENTS

The present invention advantageously addresses the needs above, as well as other needs, by providing systems and methods for performing an initial low complexity and high-speed preprocessing of received data packets, to reduce the processing burdens and improve the efficiency of communications network terminal node receivers. According to exemplary embodiments, a low complexity first stage hardware filter is provided for processing packets encapsulated using the Generic Stream Encapsulation (GSE) protocol in the encapsulation of packet data units (PDUs) within the baseband frames of a communications network (e.g., DVB-S2 baseband packets in a satellite communications system).

According to an exemplary embodiment, a method comprises receiving, by a first stage filter device, a data frame comprising one or more data packets representing one or more respective encapsulated fragments of a packet data unit (PDU), parsing, by the first stage filter device, a header of a one of the data packets to locate a start field, determining, by the first stage filter device, a logic value of the start field, wherein the logic value of the start field indicates whether the one data packet comprises a start fragment of the PDU. According to the method, when the start field indicates that the one data packet comprises the start fragment of the PDU, the method further comprises determining, based at least in part on packet label information of the header of the one data packet, whether to forward the one data packet to a second stage filter component or to discard the one data packet, and forwarding or discarding the packet accordingly, and when the start field indicates that the one data packet does not comprise the start fragment of the PDU, the method further comprises forwarding the one data packet to the second stage filter component.

According to a further method, the determination whether to forward the one data packet to the second stage filter component or to discard the one data packet may further comprise parsing, by the first stage filter device, the header of the one data packet to locate a label type (LT) field, and determining, by the first stage filter device, a logic value of the LT field, wherein the logic value of the LT field indicates whether the one data packet includes a label field, whether the one data packet comprises a packet from a broadcast PDU, and whether the one data packet comprises a label reuse case. According to this further method: when the LT field indicates that the one data packet includes the label field, the one data packet is forwarded to the second stage filter component if the label field comprises an approved label; when the LT field indicates that the one data packet comprises a packet from the broadcast PDU, the determination whether to forward the one data packet to the second stage filter component or to discard the one data packet, comprises forwarding, by the first stage filter device, the one data packet to the second stage filter component; and when the LT field indicates that the one data packet comprises the label reuse case, the determination whether to forward the one data packet to the second stage filter component or to discard the one data packet, comprises determining, by the first stage filter device, whether a prior label field comprised an approved label, and forwarding, by the first stage filter device, the one data packet to the second stage filter component if the prior label field comprised an approved label, and otherwise discarding the one data packet.

According to a further exemplary embodiment, an apparatus comprises a receiver configured to receive a data frame comprising one or more data packets representing one or more respective encapsulated fragments of a packet data unit (PDU), a parser configured to parse a header of a one of the data packets to locate a start field, a comparator configured to determine a logic value of the start field, wherein the logic value of the start field indicates whether the one data packet comprises a start fragment of the PDU, and a filter. When the comparator determines that the start field indicates that the one data packet comprises the start fragment of the PDU, the filter is configured to determine, based at least in part on packet label information of the header of the one data packet, whether to forward the one data packet to a second stage filter or to discard the one data packet, and to forward or discard the data packet accordingly, and when the comparator determines that the start field indicates that the one data packet does not comprise the start fragment of the PDU, the filter is configured to forward the one data packet to the second stage filter.

In a further apparatus, the parser is further configured to parse the header of the one data packet to locate a label type (LT) field, and the comparator is further configured to determine a logic value of the LT field, wherein the logic value of the LT field indicates whether the one data packet includes a label field, whether the one data packet comprises a packet from a broadcast PDU, and whether the one data packet comprises a label reuse case. When the comparator determines that the LT field indicates that the one data packet includes the label field, the filter is configured to forward the one data packet to the second stage filter when the label field comprises an approved label. When the comparator determines that the LT field indicates that the one data packet comprises a packet from the broadcast PDU, the filter is configured to forward the one data packet to the second stage filter. When the comparator determines that the LT field indicates that the one data packet comprises the label reuse case, the comparator is configured to determine whether a prior label field comprised an approved label, and the filter is configured to forward the one data packet to the second stage filter when the label field comprises an approved label, and to discard the one data packet when the label field does not comprise an approved label.

According to yet a further exemplary embodiment, a communications terminal apparatus comprises a first stage filter device configured to preprocess a data frame comprising one or more data packets to determine whether the data packets are intended for receipt by the terminal apparatus, wherein the data packets represent respective fragments of a packet data unit (PDU), and a second stage filter component configured to further process the data packets. The first stage filter device comprises a receiver configured to receive a data frame, a parser configured to parse the data frame to locate a start of a one of the data packets, and to parse a header of the one data packet to locate a start field, a comparator configured to determine a logic value of the start field, wherein the logic value of the start field indicates whether the one data packet comprises a start fragment of the PDU, and a filter. When the comparator determines that the start field indicates that the one data packet comprises the start fragment of the PDU, the filter is configured to determine, based at least in part on packet label information of the header of the one data packet, whether to forward the one data packet to the second stage filter component or to discard the one data packet, and to forward or discard the data packet accordingly. When the comparator determines that the start field indicates that the one data packet does not comprise the start fragment of the PDU, the filter is configured to forward the one data packet to the second stage filter component.

In a further communications terminal apparatus, the parser is further configured to parse the header of the one data packet to locate a label type (LT) field, and the comparator is further configured to determine a logic value of the LT field, wherein the logic value of the LT field indicates whether the one data packet comprises a packet from a broadcast PDU, whether the one data packet includes a label field, and whether the one data packet comprises a label reuse case. When the comparator determines that the LT field indicates that the one data packet comprises a packet from the broadcast PDU, the filter is configured to forward the one data packet to the second stage filter component. When the comparator determines that the LT field indicates that the one data packet includes the label field, the filter is configured to forward the one data packet to the second stage filter component when the label field comprises an approved label. When the comparator determines that the LT field indicates that the one data packet comprises the label reuse case, the comparator is configured to determine whether a prior label field comprised an approved label, and the filter is configured to forward the one data packet to the second stage filter component when the label field comprises an approved label, and to discard the one data packet when the label field does not comprise an approved label.

Moreover, the fragments of the PDU may be encapsulated in the data frame in accordance with Generic Stream Encapsulation (GSE) protocol, and the first stage filter device operates at a relatively substantial higher speed than the second stage filter component. Additionally, the first stage filter device may be implemented as a hardware module, comprising one or more discrete integrated circuit logic components, a programmable gate array, an application specific integrated circuit (ASIC), and firmware, whereas the second stage filter component may instead be implemented as a software module.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 illustrates a block diagram of an exemplary first stage filter of FIG. 3B, in accordance with exemplary embodiments;

DETAILED DESCRIPTION

In accordance with exemplary embodiments of the present invention, systems and methods for performing an initial low complexity and high-speed pre-processing of received data packets, to reduce the processing burdens and improve the efficiency of communications network terminal node receivers. According to exemplary embodiments, a low complexity first stage hardware filter is provided for processing packets encapsulated using the Generic Stream Encapsulation (GSE) protocol in the fragmentation and encapsulation of packet data units (PDUs) within the baseband frames of a communications network (e.g., DVB-S2 baseband packets in a satellite communications system). The first stage hardware filter is employed in a generic continuous stream mode to ease the packet traffic to customary second stage software filtering. The hardware filter is configured to filter GSE packets within a continuous GSE stream, and reducing the packet traffic flow to the second stage filter processing. The complexity and speed of the first stage filter is optimized by filtering based on identification of starting GSE packets (e.g., GSE packets with start fields of logic value "1" within their respective GSE headers), which also include label fields within the respective headers. Then, such starting packets with label information are processed with respect to the label field to identify packets with label fields matching a predetermined list of allowed labels. With this filtering scheme, only the GSE packets including the start of a PDU (including, in the case of a non-fragmented PDU, GSE packets containing a whole PDU) are pre-filtered based on the label type and label information, and only such packets that pass the pre-filtering are forwarded to the second stage processing (the software processing/filtering), and all other packets are dropped as not being intended for the particular terminal node.

Figure 1A:
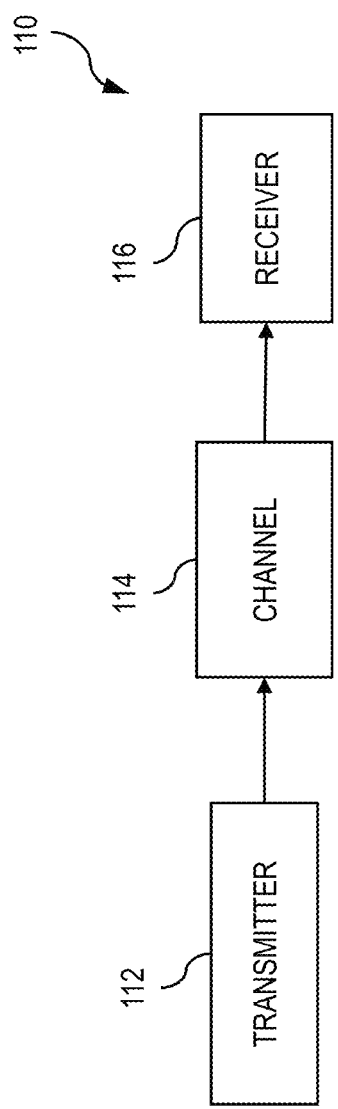
FIGS. 1A-1C illustrate communications systems capable of employing a staged filtering process for generic stream encapsulated (GSE) data traffic, according to various exemplary embodiments.
Figure 1B:
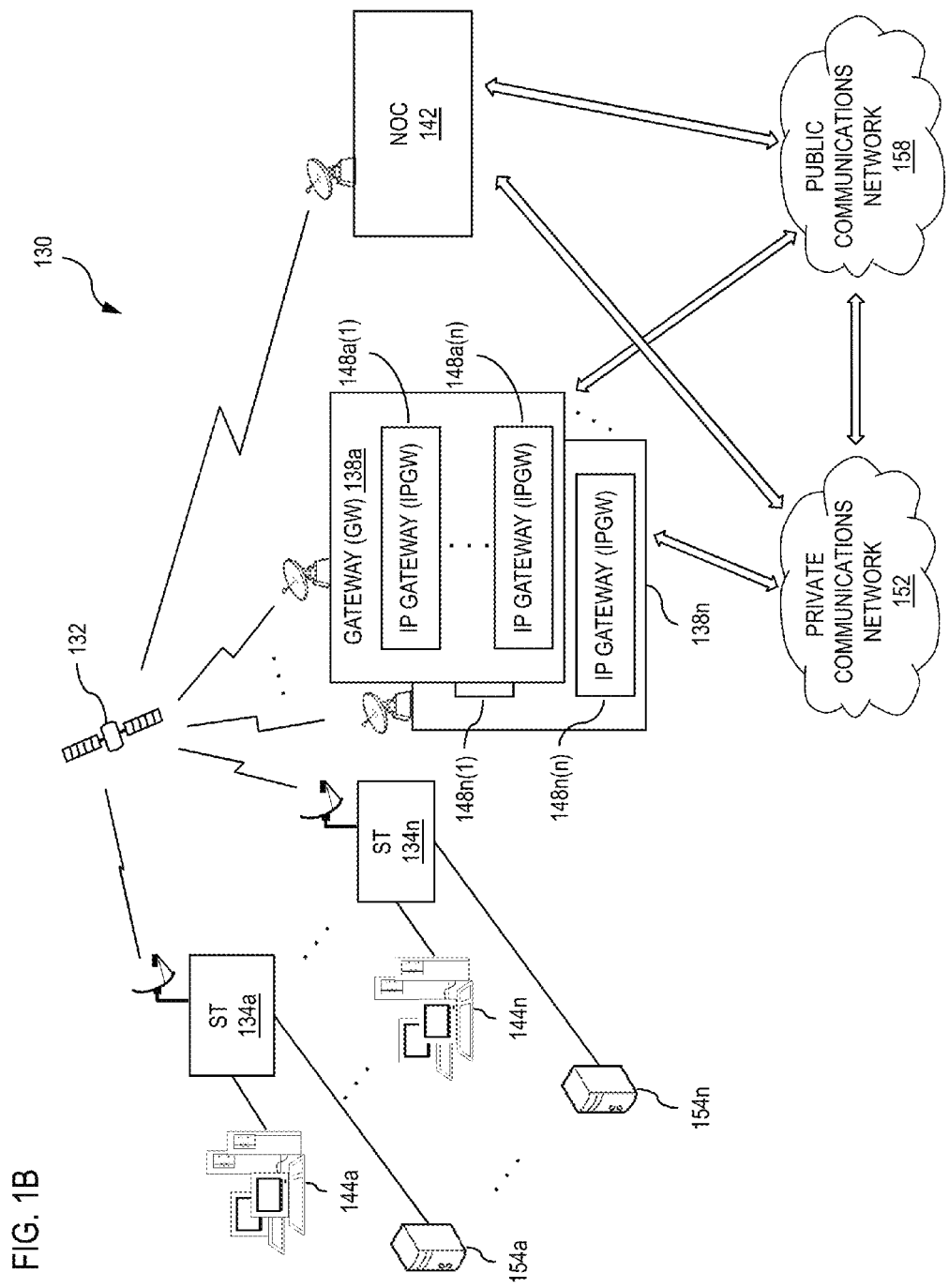
Figure 1C:
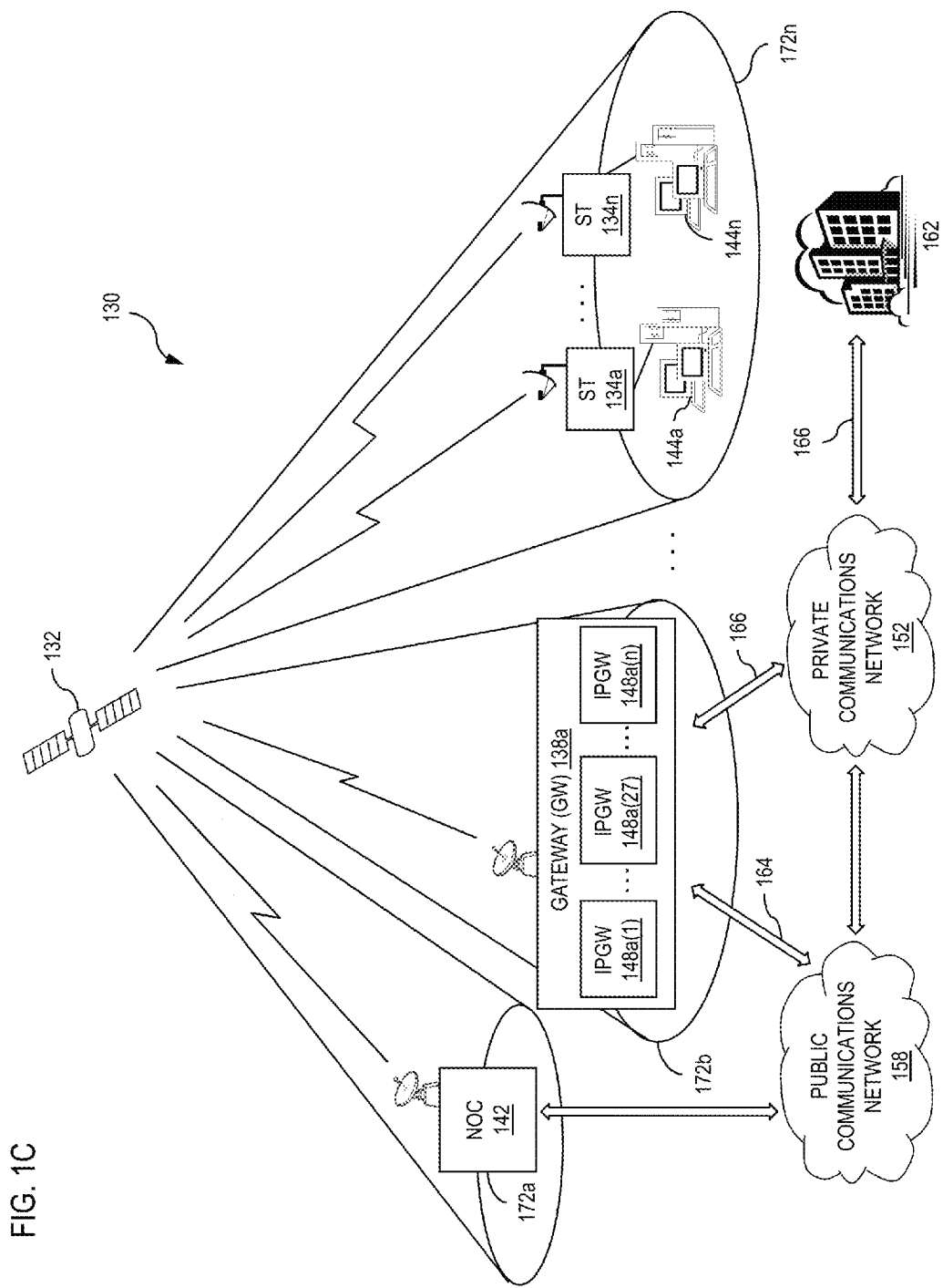

FIGS. 1A-1C illustrate communications systems capable of employing a staged filtering process for generic stream encapsulated (GSE) data traffic, providing for efficient, robust, reliable and flexible broadband services, according to various exemplary embodiments of the present invention. With reference to FIG. 1A, a broadband communications system 110 includes one or more transmitters 112 (of which one is shown) that generate signal waveforms across a communications channel 114 to one or more receivers 116 (of which one is shown). In this discrete communications system 110, the transmitter 112 has a signal source that produces a discrete set of data signals, where each of the data signals has a corresponding signal waveform. These signal waveforms are attenuated, or otherwise altered, by communications channel 114. Coding may be utilized to combat noise and other issues associated with the channel 114, such as forward error correction (FEC) codes.

FIG. 1B illustrates an exemplary satellite communications system 130 capable of supporting communications among terminals with varied capabilities, according to exemplary embodiments of the present invention. Satellite communications system 130 includes a satellite 132 that supports communications among multiple satellite terminals (STs) 134a-134n, a number of gateways (GWs) 138a-138n, and a network operations center (NOC) 142. According to different embodiments, the NOC 142 may reside at a separate site reachable via a separate satellite channel or may reside within a GW site. The NOC 142 performs the management plane functions of the system 130, while the GWs 138a-138n perform the data plane functions of the system 130. For example, the NOC 142 performs such functions as network management and configuration, software downloads (e.g., to the STs 134a-134n), status monitoring, statistics functions (e.g., collection, aggregation and reporting), security functions (e.g., key generation, management and distribution), ST registration and authentication, and GW diversity management. The NOC 142 communicates with each GW via the satellite 132, or via a secure private communications network 152 (e.g., an IPsec tunnel over a dedicated link or a virtual private network (VPN) or IPsec tunnel through a public network, such as the Internet). Additionally, each GW and the NOC have connectivity to one or more public communications networks, such as the Internet or a PSTN.

According to a further exemplary embodiment, each of the GWs 138a-138n include one or more IP gateways (IP-GWs)—whereby the data plane functions are divided between a GW and its respective IPGWs. For example, GW 138a includes IPGWs 148a(1)-148a(n) and GW 138n includes IPGWs 148n(1)-148n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Whereas, the IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be collocated with the NOC 142. The STs 134a-134n provide connectivity to one or more hosts 144a-144n and/or routers 154a-154n, respectively. The Satellite communications system 130 may operate as a bent-pipe system, where the satellite essentially operates as a repeater or bent pipe. Alternatively, the system 130 may employ a switching or processing satellite supporting mesh communications (point-to-point communications directly between, for example, the two STs 134a and 134n).

In a communications system 130 that employs a processing satellite (e.g., including a packet switch operating, for example, at a data link layer), the system may support direct unicast (point-to-point) communications and multicast communications among the STs 134a-134n and GWs 138a-138n. In the case of a processing satellite, the satellite 132 decodes the received signal and determines the destination ST or STs and/or GWs. The satellite 132 then addresses the data accordingly, encodes and modulates it, and transmits the modulated signal to the destination ST or STs (e.g., ST 134n) and/or GWs (and their respective IPGWs). According to exemplary embodiments, the system 130 thereby provides a fully meshed architecture, whereby the STs 134a-134n directly communicate, via a single hop, over the satellite 132.

In a bent-pipe system of an exemplary embodiment, the satellite 132 operates as a repeater or bent pipe, and communications to and from the STs 134a-134n are transmitted over the satellite 132 to and from respective IPGWs associated with particular STs. Further, in a spot beam system, any one spot beam (e.g., beams 172a-172n, shown in FIG. 1C) operates as a bent-pipe to geographic region covered by the beam. For example, each spot beam operates as a bent pipe communications channel to and from the STs and/or IPGW(s) within the geographic region covered by the beam. According to one embodiment, several GWs/IPGWs are distributed across the geographic region covered by all spot beams of the satellite 132, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks).

More specifically, with reference to FIG. 1C, for example, for a data communication from ST 134a to a public communications network 158 (e.g., the Internet), the ST 134a is associated with an IPGW (e.g., IPGW 148a(1)—selected from a pool of IPGWs available to the ST 134a, such as IPGWs 148a(1)-148a(27)—where the pool of IPGWs is a suitable subset of the IPGWs 148a(1)-148a(n) located at the GW 138a). The data is first transmitted, via the satellite 132, from the ST 134a to associated IPGW 148a(1). The IPGW 148a(1) determines the destination as being the Internet 158. The IPGW then repackages the data (e.g., as a TCP/IP communication), and routes the data communication, via the terrestrial link 164, to the Internet 158. Further, in a corporate network, for example, a corporation may deploy various remote STs at remote offices. More specifically, ST 134n, located at a remote corporate location, may desire to securely communicate with the corporate headquarters 162. Accordingly, for a data communication from ST 134n to the corporate headquarters 162, the data is first transmitted, via the satellite 132, from the ST 134n to an IPGW associated with the ST 134n (e.g., IPGW 148a(27)). The IPGW 148a(27) determines the destination as being the corporate headquarters 162. The IPGW then repackages the data (e.g., as an IPsec communication), and routes the IPsec data communication, via the secure terrestrial links 166 (over the private network 152), to the corporate headquarters 162. In the corporate network scenario, a further example involves a corporate communications from the corporate headquarters to a number of remote sites (e.g., a multicast communication to STs 134a-134n)—where STs 134a-134n are correspondingly associated with the two IPGWs 148a(1) and 148a(27) (e.g., grouped between the two IPGWs based on load balancing and IPGW capabilities). In this scenario, a gateway or router, within the local network of corporate headquarters 162, transmits the data communication, via the secure terrestrial links 166 (over the private network 152), to the IPGWs 148a(1) and 148a(27). The IPGWs determine that the communication is destined for the remote STs 134a-134n, and package the data as a multicast communication addressed to the community of STs 134a-134n. The IPGWs then transmit the data communication, via the satellite 132, for decoding by the community of STs 134a-134n. Accordingly, the satellite of such a system acts as a bent pipe or repeater, transmitting communications between the STs 134a-134n and their respective associated IPGWs 148a-148n.

Moreover, with respect to the networking, at the transmit and receive ends of the satellite channels, networks (e.g., enterprise wide area networks (WANs) and local area networks (LANs), and the Internet itself) generally employ a layered protocol (e.g., make use of what are sometimes called protocol stacks or layered protocols (e.g., the Open Systems Interconnection (OSI) model. Networks generally employ such layered network protocols to accommodate the vast diversity of systems and physical devices (e.g., diverse platforms, such as computers running various operating systems, smart phones, entertainment systems, etc., and diverse forms of physical connection, such as various types of wired connections, wireless connections, fiber optics, etc.). In a layered protocol, each layer is responsible for a particular kind of functionality, and each layer depends on the layers below it for other functions and provides services to the layers above it. In accordance with such a layered system, a given service can be used by multiple versions of the layer above it, and can make use of multiple versions of the layer below it. For example, in view of current large and complex systems that are constantly being updated, the layered protocol provides for the ability to change the implementation of a service without affecting other components of the system, and also different services can be implemented at each layer and can be modified or replaced without affecting the services of the other layers.

The OSI model includes seven independent protocol layers: (1) Layer 1, the physical layer, which defines electrical and physical specifications for devices, and the relationship between a device and a transmission medium, such as a copper or fiber optical cable; (2) Layer 2, the data link layer, which provides the functional and procedural means for the transfer of data between network entities and the detection and correction of errors that may occur in the physical layer; (3) Layer 3, the network layer, which provides the functional and procedural means for transferring variable length data sequences from a source host on one network to a destination host on a different network (in contrast to the data link layer which connects hosts within the same network), and performs network routing functions and sometimes fragmentation and reassembly; (4) Layer 4, the transport layer, which provides transparent transfer of data between end users, providing reliable data transfer services to the upper layers by controlling the reliability of a given link through flow control, segmentation/desegmentation, and error control; (5) Layer 5, the session layer, which controls the connections (interchanges) between computers, establishing, managing and terminating the connections between the local and remote applications; (6) Layer 6, the presentation layer, which establishes context between application layer entities, by which the higher-layer entities may use different syntax and semantics when the presentation service provides a mapping between them; (7) Layer 7, the application layer, which interacts directly with the software applications that implement the communicating component.

Generic Stream Encapsulation (GSE) provides a data link layer protocol, which facilitates the transmission of data from packet oriented protocols (e.g., Internet protocol or IP) on top of a unidirectional physical layer protocol (e.g., DVB-S2, DVB-T2 and DVB-C2). GSE provides functions/characteristics, such as support for multi-protocol encapsulation (e.g., IPv4, IPv6, MPEG, ATM, Ethernet, VLANs, etc.), transparency to network layer functions (e.g., IP encryption and IP header compression), and support of several addressing modes, a mechanism for fragmenting IP datagrams or other network layer packets over baseband frames, and support for hardware and software filtering.

Figure 2A:
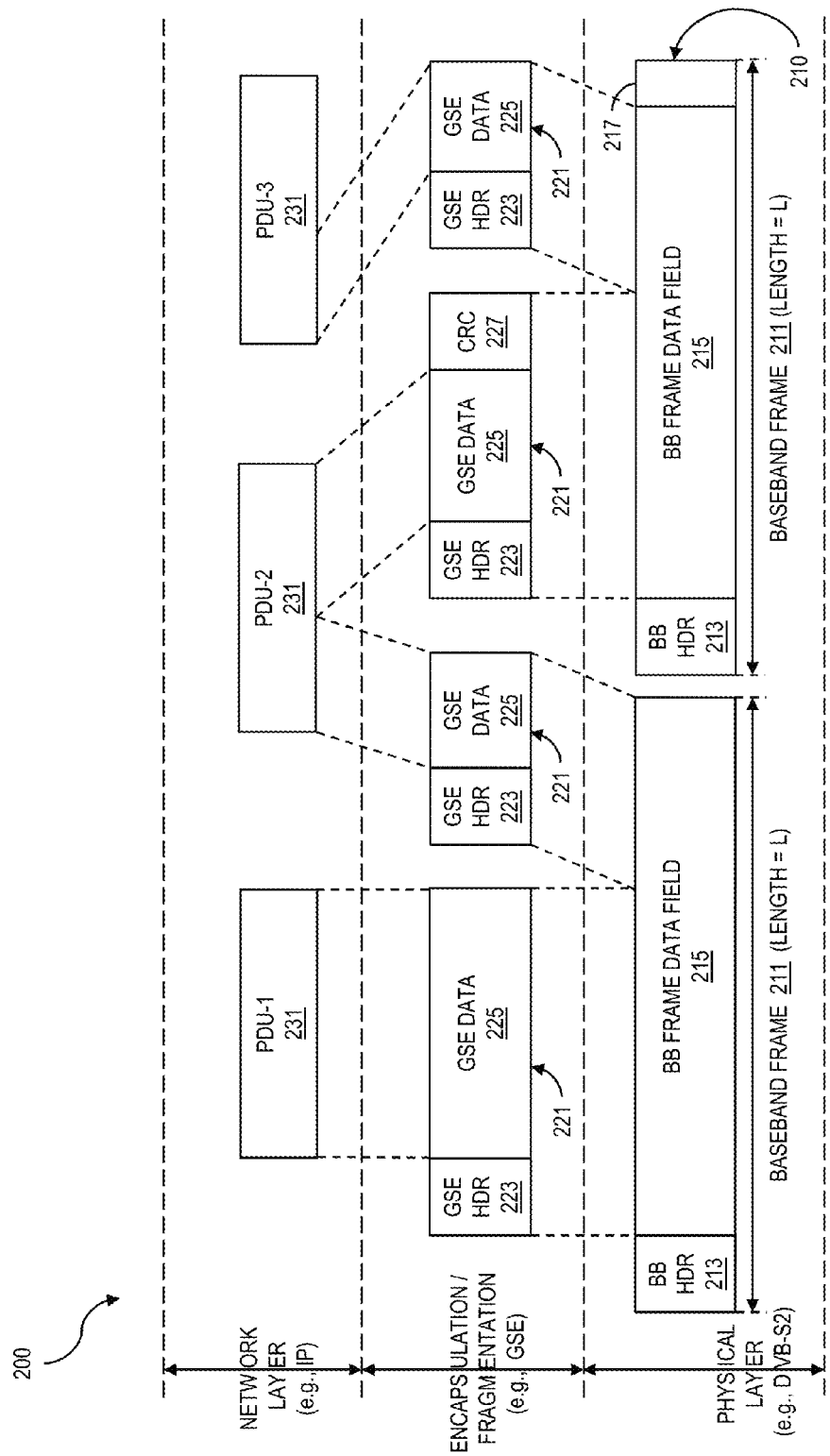
FIG. 2A illustrates an example of the Generic Stream Encapsulation (GSE) protocol layer within a network protocol stack, in accordance with exemplary embodiments.

FIG. 2A illustrates an example of the Generic Stream Encapsulation (GSE) protocol layer 100 within a network protocol stack (e.g., a DVB protocol stack), in accordance with exemplary embodiments. With reference to FIG. 2A, in a layered system, a unit of data that is specified in a protocol of a given layer (e.g., a "packet" at the network layer), and which consists of protocol-control information and possibly user data of that layer, is commonly referred to as a "protocol data unit" or PDU. At the Network Layer, data is formatted into data packets (e.g., IP datagrams, Ethernet Frames, or other network layer packets), such as the PDUs 231, for example.

PDUs that are scheduled for transmission are encapsulated in one or more GSE packets 221, each generally including a GSE header 223 and a GSE data field 225, and in some cases a cyclical redundancy check (CRC) field 227. GSE generally does not include a mechanism for integrity check of single GSE packets, except that a CRC field 227 is appended to the last PDU fragment of a fragmented PDU to verify the correctness of the PDU reassembly operation at the receiver. With regard to error detection and correction, GSE relies on the physical layer for implementation of appropriate error detection and correction processes, and thus GSE is generally independent of the specific physical layer protocols over which it operates.

The GSE encapsulation process delineates the start and end of each network-layer PDU, adds control information (e.g., identification of the network protocol type and address label), and provides an overall integrity check when needed (e.g., CRC 227). Further, as illustrated in FIG. 2A, a PDU may be fragmented among multiple GSE packets. At the physical layer, a generic data stream 210 consists of a sequence of baseband frames 211 of length L 211 (which, according to alternative embodiments, may be of variable length), which, in a wireless system, are modulated onto a carrier for transmission over the wireless channel. Each baseband frame 211 includes a baseband header 213 and a baseband data field 215. The Network Layer PDUs (or fragments of a PDU) are encapsulated and transported in GSE packets. The GSE packets are multiplexed and allocated among baseband frames, where padding 217 (when needed) is added after the last GSE Packet in a baseband frame.

Figure 2B:
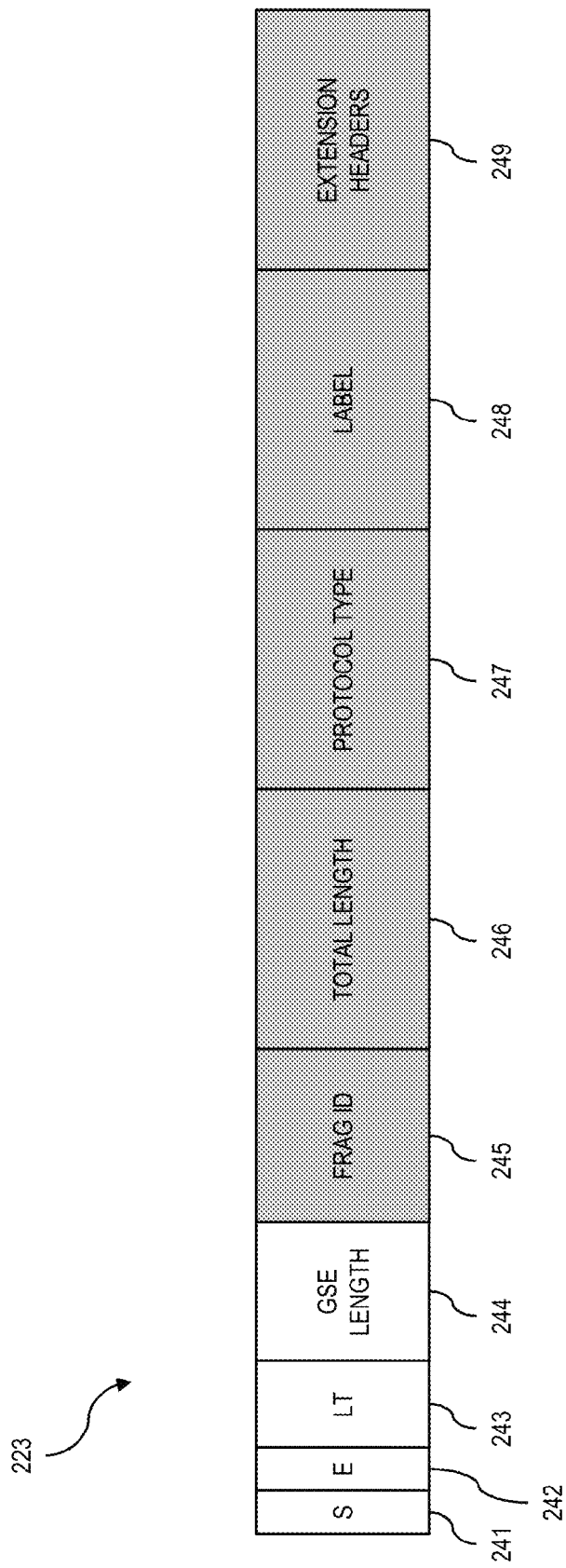
FIG. 2B illustrates an example of the GSE header format for the GSE packets of FIG. 2A, in accordance with exemplary embodiments.

FIG. 2B illustrates an example of the GSE header 223 format for the GSE packets 221 of FIG. 2A, in accordance with exemplary embodiments. Each GSE packet comprises a GSE header followed by a GSE data field or payload 225 (wherein the encapsulated PDU, or PDU fragment, is contained). The GSE header generally comprises the fields depicted in FIG. 2B, where the un-shaded fields are always present, while the shaded fields may be omitted depending on the preceding control fields in the first three fields of the GSE header. The Start field 241 is a one-bit field that indicates whether the GSE packet contains the start of a PDU, where a value of "1" indicates that the GSE packet contains the start of either a whole PDU or a PDU fragment, and a value of "0" indicates that the start of a PDU is not present in the GSE packet. The End field 242 is a one-bit field that indicates whether the GSE packet contains the end of a PDU, where a value of "1" indicates that the GSE packet contains the end of either a whole PDU or a PDU fragment, and a value of "0" indicates that the end of a PDU is not present in the GSE packet. Accordingly, if the start and end indicator fields are both "1," then the GSE packet contains a whole PDU, whereas, if the start and end indicator fields are both "0," then the GSE packet contains a fragment of a PDU without either a start fragment or an end fragment of the PDU. The Label Type field 243 is a two-bit field, which indicates as follows: (1) a "00" indicates that a 6-byte Label is present; (2) a "01" indicates that a 3-byte Label is present; (3) a "10" indicates that the packet is a broadcast packet; and (4) a "11" indicates a label re-use, where the label from the previous GSE packet of the same baseband frame is used (e.g., this is generally used for transmitting a sequence of GSE packets with the same label without repeating the label field, and the "11" value is not used in this field for the first GSE packet of the baseband frame). The GSE Length field 244 is a twelve-bit field that indicates the length (in bytes) of the GSE packet, counted from the byte following the GSE Length field (the GSE Length field points to the start of the following GSE packet, or to the end of the data field or start of the padding field when the GSE packet is the last in the baseband frame). For padding, the start and end fields are both set to "0", and the Label Type field is set to "00", and otherwise, if the Start field is "0", then the Label Type field is reserved and set to "11".

The Fragment ID field 245 is a one-byte field that is present when a PDU fragment is included in the GSE packet, where all GSE packets containing PDU fragments belonging to the same PDU contain the same Fragment ID value. The Fragment ID field will not be present when the Start and End fields are both "1". The Total Length field 246 is a two-byte field that is present in the header of a GSE packet carrying the first fragment of a fragmented PDU, where the 16-bit field reflects the value of the total length (in bytes) of the Protocol Type, Label (e.g., 6-byte or 3-byte Label), Extension Headers, and the full PDU. Accordingly, while the length of a single GSE packet is generally limited (based on the 12-bit GSE Length field) to 4,096 bytes, fragmentation facilitates support of larger PDUs (e.g., up to a total length of 65,536 bytes). The Protocol Type field 247 is a 16-bit field that indicates either the type of payload carried in the PDU, or the presence of a next-header, whereby the presence of possible extension headers is determined by the protocol type value. The Label field 248, when present, carries either a 6-byte label or a 3-byte label used for addressing purposes. The Extension Headers 249 are optional bytes that may be used to carry one or more extension header(s).

Figure 2C:
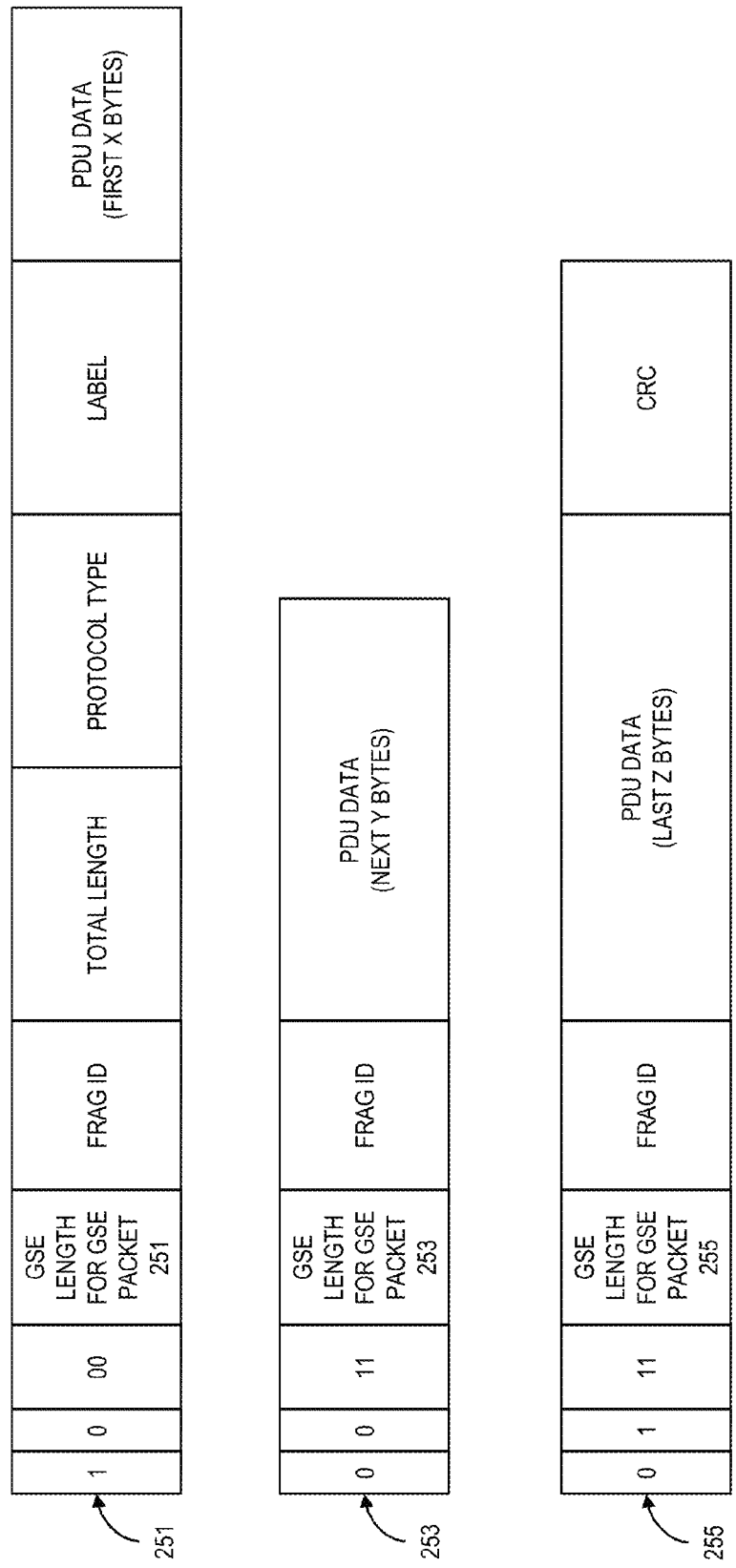
FIG. 2C illustrates and example of the GSE packets resulting from the fragmentation of a PDU into three fragments, in accordance with exemplary embodiments.

FIG. 2C illustrates and example of the GSE packets resulting from the fragmentation of a PDU into three fragments, in accordance with exemplary embodiments. The GSE packets containing fragments from the same PDU will have the same Fragment ID value. Further, while the GSE packets containing fragments from the same PDU are transmitted in order, they may not be transmitted consecutively, but rather may be interleaved with GSE packets carrying full PDUs or fragments of other PDUs (having different Fragment ID values). The following rules apply to fragmentation of PDUs at the GSE layer: (1) all GSE packets containing fragments from the same PDU will have the same Fragment ID field value; (2) the first GSE packet with a given Fragment ID will shall have the Start field set to "1" and the End field set to "0"; (3) the GSE packets carrying PDU fragments, which are neither the first nor the last PDU fragment, will have both the Start and End fields set to "0"; (4) The last GSE packet with a given Fragment ID will have the Start field set to "0" and the End field set to "1"; (5) the Fragment ID value of a PDU that is still incomplete will not be reused within a period of 256 baseband frames; (6) all GSE packets with the same Fragment ID value will be transmitted in order; and (7) the Label field is used only in the first GSE packet of the GSE packets containing fragments having the same Fragment ID value (the GSE packet containing the first fragment of the PDU out of the GSE packets containing the fragments from the same PDU).

With reference to FIG. 2C, for example, GSE encapsulator takes the first X bytes of the PDU and forms the GSE packet 251, with the S bit is set to "1" and the E bit set to "0". The GSE Length field is set to a calculated number of bytes, including the GSE data field carrying the first X bytes of the PDU, the Fragment ID field, the Total Length field, the Protocol Type field, the Label field (if present), and any Extension Headers (where the GSE packet length cannot exceed the remaining free space within the data field of the current baseband frame). The Fragment ID is set to a free value, and the Total Length field is set to a calculated number of bytes, including the total number of bytes of the entire PDU, the Protocol Type field, the Label field (if present), and any extension headers. Further, an appropriate Protocol Type field and Label field (when applicable) are added, and the first X bytes of the PDU are inserted as the GSE data field. When the PDU is divided into more than two fragments, the GSE encapsulator takes the next Y bytes of the PDU data and forms the GSE packet 253, with the S bit is set to "0" and the E bit set to "0". The GSE Length field is set to a calculated number of bytes, including the GSE data field carrying the next Y bytes of the PDU and the Fragment ID field (where the GSE packet length cannot exceed the remaining free space within the data field of the current baseband frame). The Fragment ID is set to the same value as for the previous fragments of the PDU, and the next Y bytes of the PDU are inserted as the GSE data field. For the final fragment of the PDU, the GSE encapsulator takes the remaining Z bytes of the PDU data and forms the GSE packet 255, with the S bit set to "0" and the E bit set to "1". The GSE Length field is set to a calculated number of bytes, including the GSE data field carrying the final Z bytes of the PDU, the Frag ID field, and the CRC field (where the GSE packet length cannot exceed the remaining free space within the data field of the current baseband frame). The Fragment ID is set to the same value as for the previous fragments of the PDU. Lastly, the next Y bytes of the PDU are inserted as the GSE data field, and a CRC field is appended to the GSE packet.

Figure 2D:
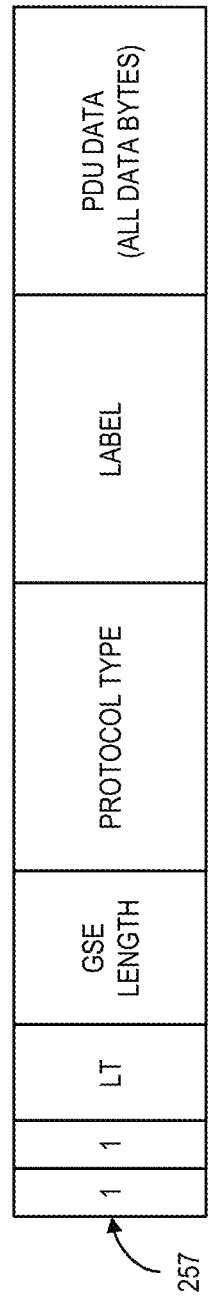
FIG. 2D illustrates and example of the GSE packet resulting from a PDU that is not fragmented, in accordance with exemplary embodiments.

FIG. 2D illustrates and example of the GSE packet resulting from a PDU that is not fragmented, in accordance with exemplary embodiments. In the case of a non-fragmented PDU, all data bytes of the PDU are encapsulated in one GSE packet 257. Accordingly, because the GSE packet 257 includes both the start and end of the encapsulated PDU, both the S-field and the E-field are of a logic value of "1." Further, there is no need for a fragment ID (because there are not multiple fragments), and there is no need for a total length field (because the entire PDU is encapsulated within that GSE packet 257).

Further details of the GSE protocol are provided in the European Telecommunications Standards Institute publications: ETSI TS 102 606 V1.1.1 (2007-10), "Digital Video Broadcasting (DVB); Generic Stream Encapsulation (GSE) Protocol;" and ETSI TS 102 771 V1.1.1 (2009-06), "Digital Video Broadcasting (DVB); Generic Stream Encapsulation (GSE) implementation guidelines."

Figure 3A:
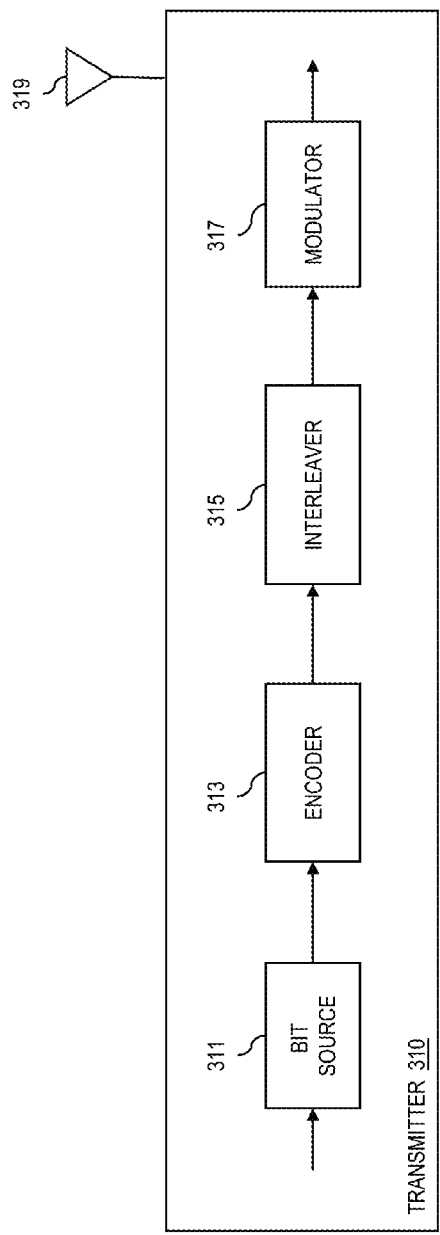
FIG. 3A illustrates a block diagram of an exemplary transmitter, configured to operate in the systems of FIGS. 1A, 1B and 1C, in accordance with exemplary embodiments.
Figure 3B:
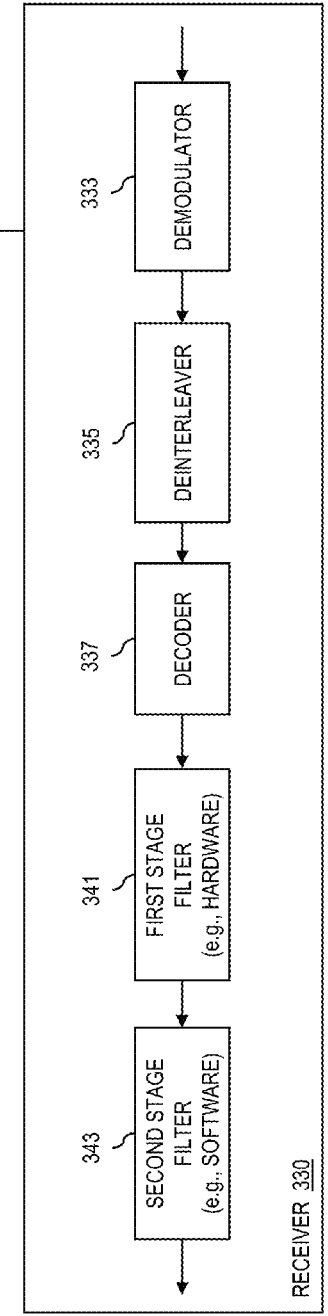
FIG. 3B illustrates a block diagram of an exemplary receiver, configured to operate in the systems of FIGS. 1A, 1B and 1C, in accordance with exemplary embodiments.

FIG. 3A is a block diagram of an exemplary transmitter, configured to operate in the systems of FIGS. 1A, 1B and 1C, in accordance with exemplary embodiments. In this embodiment, the transmitter 310 is equipped with an encoder (e.g., an FEC encoder) 313 that accepts input from an bit information source 311 and outputs coded stream of higher redundancy suitable for error correction processing at the receiver (shown in FIG. 3B). Essentially, the encoder 313 generates the coded stream, and forwards it to an interleaver 315, which reorders the sequence of symbols or bits from the encoder in a predetermined manner. The interleaved signal is fed to a modulator 317, which maps the encoded messages from encoder to signal waveforms that are transmitted over the communications channel (e.g., channel 114) to the satellite 132 via a transmit antenna 319. FIG. 3B is a block diagram of an exemplary receiver, configured to operate in the systems of FIGS. 1A, 1B and 1C, in accordance with exemplary embodiments. The receiver 330 includes an antenna 331 that receives the waveforms emitted over the communications channel (e.g., channel 114) from the satellite 132. The receiver 330 also includes a demodulator 333 that performs demodulation of the received signals. After demodulation, the received signals are forwarded to a channel de-scrambler or deinterleaver 335 to unscramble the symbols, and a decoder 337 then attempts to reconstruct the original source messages. It is contemplated that the transmitter 310 and receiver 330 may be deployed in within a single wireless terminal (e.g., the STs 134a to 134n, the GWs 138a to 138n, the IPGWs 148a(1) to 148a(n) and 148n(1) to 148n(n), and the NOC 142) in which case a common antenna system can be shared. The wireless terminal can for example be configured to operate within a satellite communications system (e.g., the satellite system 130), a cellular system, wireless local area network (WLAN), etc.

With reference again to FIGS. 1B and 1C, the STs 134a-134n include a decision portion (described below in more detail with reference to FIG. 9 and FIG. 10) and a processing portion (described below in more detail with reference to FIG. 9 and FIG. 11). By way of example, the decision portion may be performed in a fast manner via hardware and processing portion may be performed in software in a slower manner. The fast processing performed by decision portion aids in preventing the slower processing portion from receiving more information than can be processed by the processing portion.

For purposes of discussion, consider ST 134a as one of 10,000 terminals. Furthermore, for purposes of this discussion, consider a multicast message to transmitted from satellite 232 with information for the 10,000 terminals communicated via 10,000 packets with one packet destined for ST 134a. In the conventional system, a terminal would perform detailed processing for the 10,000 received packets, of which only one needs detailed processing. This detailed processing for the 10,000 received packets results in wasted processing complexity, power consumption, resources and bandwidth, with respect to the processing of the 9,999 packets not destined for the terminal of interest. In accordance with aspects of the present invention, however, the ST 134a receives the 10,000 packets and performs a quick and low complexity initial processing and filtering (e.g., a hardware implemented processing and filtering) to reduce the burden of a subsequent more detailed processing (e.g., software processing) to determine the packets actually destined for the ST 134a. For purposes of discussion, ST 134a may determine that 8,000 packets do not require further processing and may be discarded. As such, ST 134a would only need to further process 2000. Clearly, in this example, ST 134a will eventually determine that only one packet is intended for the ST 134a. Nevertheless, ST 134a, in accordance with aspects of the present invention, will only have to fully process 1,999 packets not intended for the terminal, instead of fully processing all 9,999 packets not destined for the terminal. The processing burden is thereby significantly reduced, resulting in improved processing complexity, power consumption, resources and bandwidth.

Accordingly, with reference again to FIG. 3B, in accordance with exemplary embodiments, the receiver 330 further includes the first stage filter 341 and second stage filter 343. The first stage filter 341 processes data frames and packets received from the decoder 337 as a pre-processing and filtering function prior to potential further processing by the second stage filter 343, and forwards to the second stage filter 343 only packets that satisfy certain filtering conditions. By way of example, the first stage filter 341 may operate at an increased rate of performance as compared to the second stage filter 343, such as an implementation of the first stage filter in hardware and the second stage filter in software.

Figure 5:
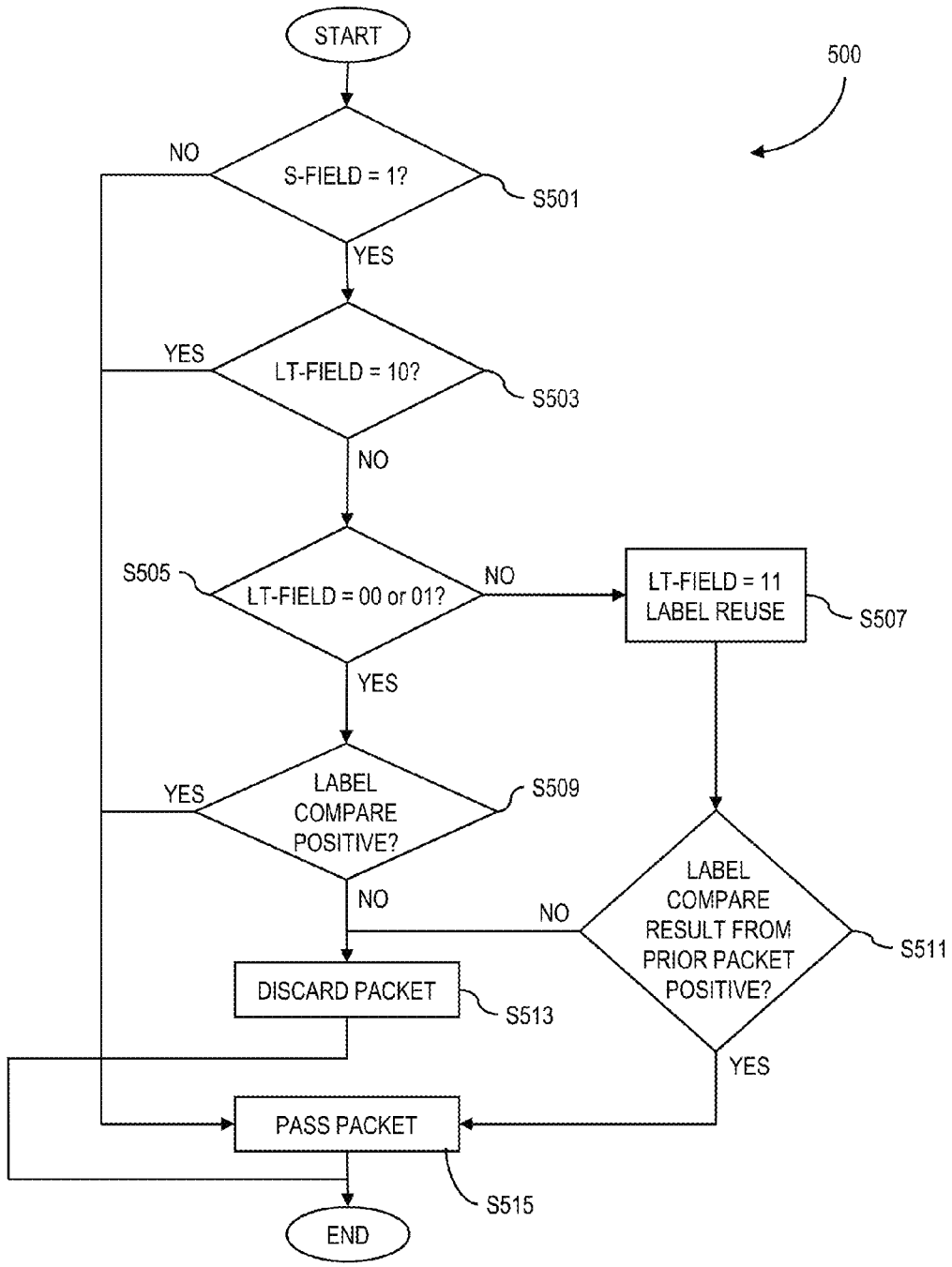
FIG. 5 illustrates a flow chart depicting a process of the first stage filter of FIGS. 3B and 4, in accordance with an exemplary embodiment.

FIG. 4 illustrates a block diagram of an exemplary first stage filter 341 of FIG. 3B, in accordance with exemplary embodiments, and FIG. 5 illustrates a flow chart depicting a process of the first stage filter 341 of FIGS. 3B and 4, in accordance with an exemplary embodiment. The exemplary first stage filter 341 comprises a packet parser module 411, an SE-compare module 413, an LT-compare module 415, a label compare module 417, a label memory module 423 and a packet filter module 421. The packet parser 411 receives the decoded data packets from the decoder 337, and parses the data to identify and extract certain respective baseband header information indicating, at a minimum, the location of the start of the first encapsulated GSE packet within the baseband frame. According to one exemplary embodiment, the processing of the data by the first stage filter 341 is performed on the basis of a baseband frame 211 (e.g., on a baseband frame-by-baseband frame basis). At the start of a baseband frame, the parser 411 locates the start of the first GSE packet using field information from the baseband header 213. By way of example, the packet parser may comprise shift register logic configured to shift through the baseband frame header to locate the field information, and, based on the field information, shift through the baseband frame data to locate the start of the first GSE packet. As will readily be recognized, other implementations may be employed for the packet parser 411, such as demultiplexers or a combination of shift registers and demultiplexers. Further, the start of the next GSE packet may be determined by the first stage filter 341 using the GSE_length field 244 of the current GSE packet header 223. According to this embodiment, after all GSE packets of a particular baseband frame have been processed by the first stage filter 341, the first stage filter 341 resets, and begins processing the next baseband frame. Accordingly, this embodiment reflects memory-less implementation across baseband frames, which results in a low complexity implementation (e.g., in the case of a hardware implementation).

Once the start of the start of the first GSE packet is located, the packet parser 411 will parse the GSE header 223 to locate the first two bits of the header (e.g., the S-field 241 and E-field 242) for a determination as to whether the packet is a starting GSE packet that contains a starting PDU segment. Again, the parser 411 may accomplish the parsing of the GSE header via shift register logic, demultiplexer logic, or a combination thereof, or other implementations, as would be recognized by one of ordinary skill in the art. The parser 411 then forwards the S-field and E-field data to the SE-compare module 413, which 413 performs processing associated with the S-field and the E-field. Specifically, with reference to FIG. 5, the SE-compare module 413 determines whether the S-field is equal to a logic "1" (S501). Additionally, for purposes of fetching the actual label from the header, the SE-compare module will also determine the logic value of the E-field (to determine whether the GSE packet contains an non-fragmented PDU, which governs the number of bytes skipped to locate the start of the label field (as described below with respect to S607-S611 of FIG. 6). For example, the SE-compare module 413 may determine the logic value of the S-field and E-field via standard comparator logic, or other digital logic implementations, as would be recognized by one of ordinary skill in the art. An S-Field of logic "1" indicates the respective GSE packet comprises the start fragment of an encapsulated PDU, whereas an S-Field of logic "0" indicates that the respective GSE packet does not comprise the start fragment of an encapsulated PDU. The state of the S-field is further illustrated in FIG. 2C, where the S-field is of a logic "1" for the GSE packet 251, which contains the start byte of the encapsulated PDU. If the packet is a non-starting packet then it is forwarded, via the packet filter module 421, to the second stage filter 343 for further processing. With reference to FIG. 5, if the S-field is a "0," then the process would proceed to step S515 where the packet is forwarded on, via the packet filter 421, to the second stage filter 343 for further processing. For example, the SE-compare module may provide the S-field determination result to the packet filter 421, and a result of the S-field being of a logic value "0" would trigger the packet filter to forward the packet to the second stage filter 343. The packet filter may comprise a register configuration triggered to forward the packet data based on logic data received from the SE-compare, LT-compare and label compare modules 413, 415, 417, or may comprise any other appropriate logic configuration, as would be recognized by one of skill in the art.

Alternatively, if the SE-compare module 413 determines that the GSE packet is a starting packet (the S-field is a logic value "1"), then the first stage filter 341 performs further processing with respect to the LT-filed and the label field. As mentioned above, only the first GSE packet of the GSE packets containing fragments having the same Fragment ID value (fragments from the same PDU) contain a label field 248, and thus an S-field of logic "1" also indicates that the GSE header includes a label field (unless a label reuse condition exists, as described below). Additionally, in the case of a non-fragmented PDU, the GSE packet in which the PDU is encapsulated will include both the start and the end of the PDU (the S-field and E-field will both be ="1"), and thus the packet will also include a label field 248. Accordingly, if the S-field is of a logic value of "1" (irrespective of the E-field), then the process proceeds to step S503 for further processing of the GSE header with respect to the label. Specifically, label type information is extracted from the Label Type field (LT-field) 243 of the GSE header. By way of example, the SE-compare module 413 provides the result from the determination of the S-field value back to the packet parser 411, and, when the S-field comprises a logic "1" value, the parser parses the GSE header to locate and extract the LT-field information. The packet parser 411 then forwards the LT-field information to the LT-compare module 415 for a determination of the logic value of the LT-field. For example, as with the SE-compare module 413, the LT-compare module 415 may determine the logic value of the LT-filed via standard comparator logic, or other digital logic implementations, as would be recognized by one of ordinary skill in the art. As an alternate implementation, the packet parser 411 may send the S-field data to the SE-compare module 413 and the LT-field data to the LT-compare module 415 simultaneously, and the SE-compare module would send the result from the S-field comparison to the LT-compare module. The LT-compare module 415 could then determine how to proceed based on the S-field result data provided by the SE-compare module.

The LT-compare module 415 then determines the logic state or value of the LT-field 243. With reference to FIG. 5, the LT-compare module 415 first determines whether the LT-field is equal to "10" (S503). An LT-field equal to "10" indicates that the packet is a broadcast message intended for all terminals, and that no label field 248 is present in the GSE header 223. In other words, an LT-field value of "10" indicates that the packet comprises a broadcast packet intended for all terminals monitoring that transmit channel, and as such the packet is forwarded by the first stage filter 341 to the second stage filter 343 without further processing. Accordingly, in the case where the LT-field is of a logic value "10," the packet is forwarded, via the packet filter 421, to the second stage filter 343 for further processing (S515).

If the LT-field is not equal to "10," then the process proceeds to step S505, where the LT-compare module 415 determines whether the LT-field is equal to either a logic "00" or "01." An LT-field of "00" indicates the presence of a 6 byte label and an LT-field of "01" indicates the presence of a 3 byte label. If the LT-field is equal to "00" or "01," then (based on the label field length indicated by the LT-field (3 or 6 byte)) the packet parser 411 can extract the label field 248 from the GSE header 223. For example, the LT-compare module 415 provides the result of the LT-field determination back to the packet parser 411, and (based on the indicated label length) the parser further parses the GSE header 223 and extracts the label field 248. Once extracted, the packet parser provides the label 248 to the label compare module 417 to determine whether the label is one of a set of allowable labels in accordance with a predetermined table of allowable labels (label memory 423). At step S509, the label compare module 417 compares the label against a predetermined table of allowable labels (e.g., label memory 423, comprising a pre-programmed set of allowable labels stored in the terminal receiver). In the case where the label comparison yields a positive result (a match is determined between the label and an entry in the label memory 423), the packet is forwarded, via the packet filter 421, to the second stage filter 343 for further processing (S515). Alternatively, in the case where the label comparison yields a negative result (no match can be determined between the label and any entry of the table), the packet is dropped (S513). For example, the label compare module 417 provides the result from the label comparison to the packet filter, where a positive result triggers the packet filter to forward the packet to the second stage filter 343 (S515), and a negative result triggers the first stage filter to not forward the packet to the second stage filter (e.g., to drop or discard the packet)(S513).

Further, the result of the comparison is saved by the first stage filter 341 for label reuse scenarios, where the result from the previous label comparison is used to determine a label match for subsequent GSE packets utilizing the same label (label reuse). If the LT-field is determined at steps S503 and S505 as not being of a logic value of "10," "00," or "01," then the LT-field is determined to be of a logic value "11" (S507), which indicates that the respective GSE packet reflects a label reuse case, and the process then proceeds to step S511. The label reuse is used for transmitting a sequence of GSE packets with the same label without repeating the label field in each packet. A label reuse case indicates that no label field 248 is present in the GSE header 223, and that the first stage filter 341 should resort to the label comparison result saved from the prior GSE packet that included a label field in the GSE header. In other words, if the label compare portion 417 determines a table match for the label of a GSE packet that contains a label field 248 (e.g., a positive result), then that positive result will apply to each successive GSE packet where a label reuse condition is indicated (e.g., an S-field of "1" and LT-field of "11"). For example, in the case of a GSE packet header where the S-field is a "1" (indicating the presence of the start fragment of the respective PDU being included in the GSE packet), and where the LT-field indicates the presence of a label field, the packet filter 421 (for example) will store the label compare result from that GSE packet for application to subsequent label reuse packets. As will be appreciated, alternatively, the label compare module 417 may store the label compare result from that GSE packet for application to subsequent label reuse packets. Accordingly, at step S511, either the label compare module 417 or the packet filter module 421 will refer to the saved label compare result to determine whether the current label reuse GSE packet reflects a match with the label memory 423. In the case where the saved label comparison result is positive, the packet is forwarded, via the packet filter 421, to the second stage filter 343 for further processing (S515), and in the case where the saved result is negative, the packet is dropped (S513). For example, the saved label comparison result will trigger the packet filter 421 to either forward or drop the packet.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, while the foregoing exemplary embodiments reflect the configuration and processes of FIGS. 4, 5 and 6, it will be appreciated that various alternative implementations would be possible without departing from the broader scope of the present invention. In other words, the various functions of embodiments of the present invention, as described with respect to the modules and components of FIG. 4, may be implemented via various different configurations. For example, one or more of the functions of the SE-compare, LT-compare and/or label compare modules may be performed by the packet filter module or the packet parser module. Further, the functions of the packet filter module, in an alternative configuration may be combined with the packet parser module. As will be appreciated, such alternative implementations may be based on trade-offs between speed and component costs (e.g., ASIC or programmable gate array sizes and complexity), and may depend on particular hardware implementations of the specific parsing and analysis/comparison functions. Accordingly, the particular implementations illustrated and described herein should be regarded in an illustrative rather than restrictive sense.

Figure 6:
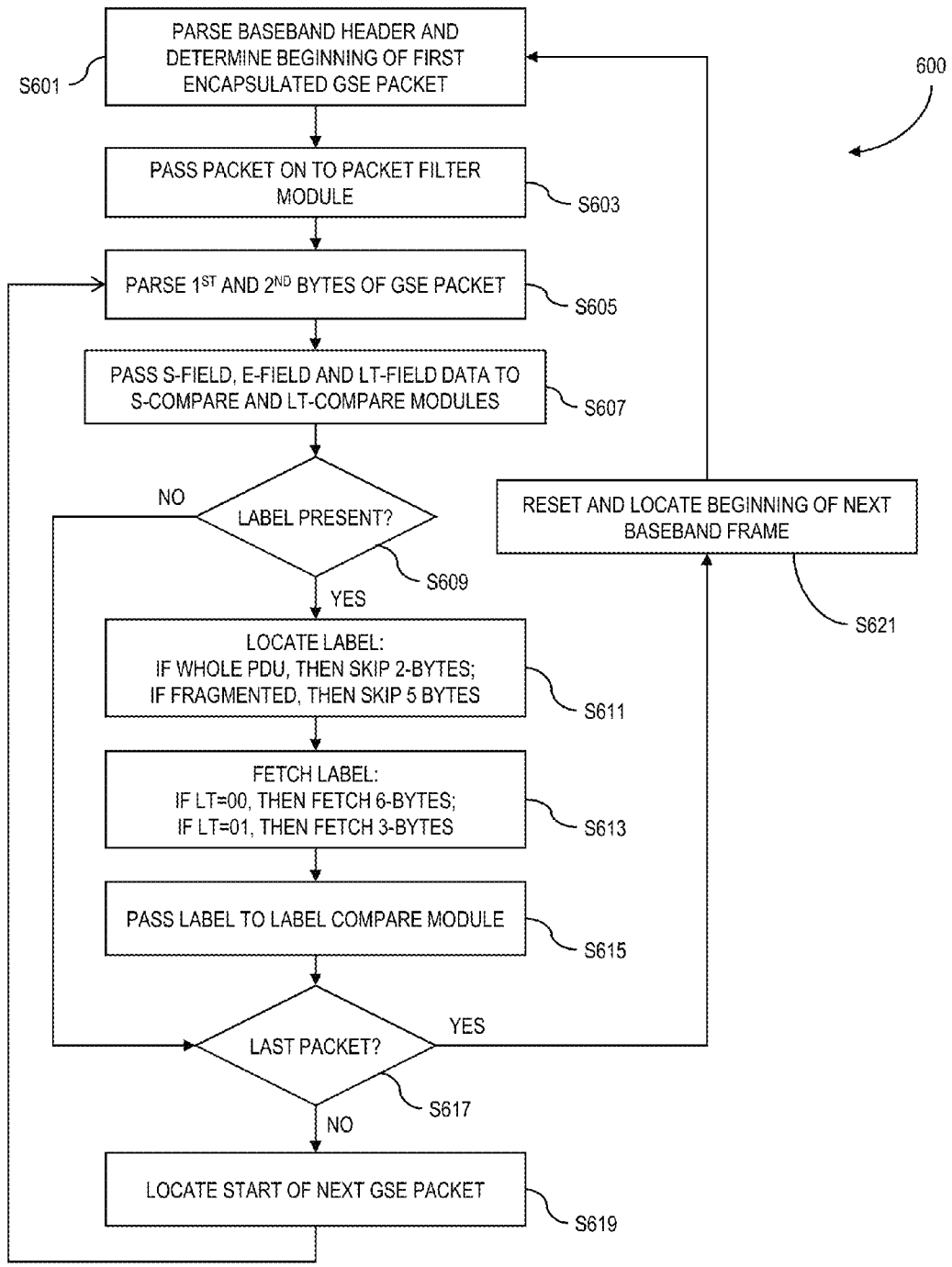
FIG. 6 illustrates a flow chart depicting a process of the packet parser of FIG. 4, in accordance with an exemplary embodiment.

FIG. 6 illustrates a flow chart depicting a process of the packet parser 411 of FIG. 4, in accordance with an exemplary embodiment. As described above, the packet parser parses the data of a baseband frame to determine certain header information regarding the GSE packets encapsulated within the baseband frame. Based on this header information, the packet parser 411 determines the beginning of the first GSE packet encapsulated within the baseband frame (S601), and forwards the packet to the packet filter module 421 (S603). The parser then parses the first and second bytes of the GSE packet (the S, E, LT and GSE_length fields 241, 242, 243, 244 of the GSE header 223)(S605), and provides the S, E and LT fields the SE-compare module 413 and LT-compare module 415, respectively (S607). Based on the processing of the S, E and LT field information by the SE-compare and LT-compare modules (as described with respect to FIGS. 4 and 5), the packet parser 411 determines whether label information is present within the GSE header (S609). The parser then locates and fetches the label per steps S611 and S613, and provides the label to the label compare module 417 (S615). The packet parser 411 then determines whether the last GSE packet of the baseband frame has been processed (S617). If the last packet has been processed, then the packet parser resets and locates beginning of the next baseband frame (S621), and returns to step S601 for processing of the next baseband frame. If the last packet has not been processed, then the packet parser locates the start of the next GSE packet encapsulated within the present baseband frame (S619), and returns to step S605 for processing of the next GSE packet.

The second stage filter 343 performs further processing of the packets passed on to it from the first stage filter 341 for a further determination of the particular packets intended for the specific terminal, and for decoding those particular packets. For example, such further processing would be based on the further GSE header information fields (e.g., the Fragment ID 245, total length 246, protocol type 247 and extension header 249), as is typically performed in a system employing GSE encapsulation. In accordance with exemplary embodiments of the present invention, however, in view of the higher speed, pre-processing of the GSE packets performed by the first stage filter 341, the more involved and slower processing of the second stage filter 343 need be performed with respect to only the packets passed through by the first stage filter (as opposed to having to process all packets, as in typical prior systems).

As described in detail above, the first stage GSE packet filter processes each GSE packet in a baseband frame, employing filtering decisions based on only information available within the baseband frame, which significantly reduces the complexity of a high-speed, hardware filter implementation. First, with respect to a starting GSE packet, the starting GSE packets carry destination address information in the label field. Accordingly, by matching the label field of a starting GSE packet header with allowable labels in a preprogrammed lookup table, the first stage filter 341 filters the starting GSE packets to make an initial determination and drop the packets not intended for the particular terminal. Further, the filter uses the previous lookup comparison result to decide if a starting packet with label-re-use should pass the filter on to the second stage. All the broadcast type packets are also identified at this stage and are forwarded to the second stage. Non-starting GSE packets, on the other hand, do not contain a label field in their headers, and thus do not contain any destination address information. Accordingly, the first stage filter forwards all non-starting GSE packets to the second stage, which can be easily handled by typical filtering (e.g., customary software filters). Accordingly, in accordance with such exemplary embodiments, the first stage filter performs a high speed pre-processing of the packets (dropping certain packets determined as not being intended for the particular terminal), and thereby reduces the processing load on the second stage filter—resulting in a reduction in power consumption, bandwidth usage and timing delays, and improving the overall decoding efficiency of the terminal receiver.

Figure 7:
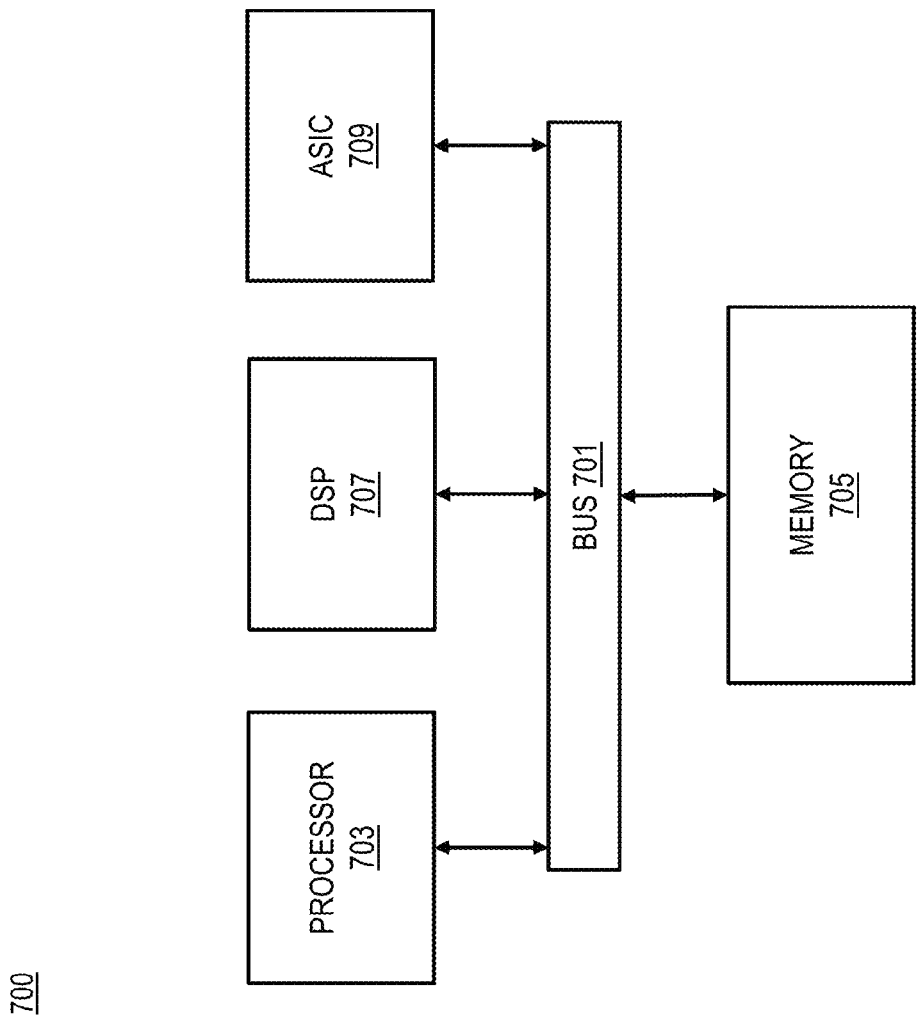
FIG. 7 illustrates a chip set with respect to which embodiments of the invention may be implemented.

FIG. 7 illustrates a chip set 700 with respect to which embodiments of the invention may be implemented. Chip set 700 includes, for instance, processor and memory components described with respect to FIG. 7 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 700 includes a communication mechanism such as a bus 701 for passing information among the components of the chip set 700. A processor 703 has connectivity to the bus 701 to execute instructions and process information stored in, for example, a memory 705. The processor 703 includes one or more processing cores with each core configured to perform independently. A multi-core processor enables multiprocessing within a single physical package. Examples of a multi-core processor include two, four, eight, or greater numbers of processing cores. Alternatively or in addition, the processor 703 includes one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, and/or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 703 and accompanying components have connectivity to the memory 705 via the bus 701. The memory 705 includes both dynamic memory (e.g., RAM) and static memory (e.g., ROM) for storing executable instructions that, when executed by the processor 703 and/or the DSP 707 and/or the ASIC 709, perform the process of exemplary embodiments as described herein. The memory 705 also stores the data associated with or generated by the execution of the process.

While exemplary embodiments of the present invention may provide for various implementations (e.g., including hardware, firmware and/or software components), the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A data packet filtering method, wherein the method is performed by a first stage filter portion of a receiver device in order to filter data packets to reduce processing loads of a second stage filter portion of the receiver device, the method comprising:

receiving, by the receiver device, a signal transmitted over a wireless channel;

demodulating and decoding the received signal to recover a plurality of data frames, each comprising one or more data packets representing one or more respective encapsulated fragments of a packet data unit (PDU);

parsing, by the first stage filter portion of the receiver device, a header of a one of the data packets to locate a start field, wherein the start field indicates whether the one data packet comprises a start fragment of the PDU; and determining whether the start field indicates that the one data packet comprises a start fragment of the PDU; and wherein, when the start field indicates that the one data packet comprises the start fragment of the PDU, the method further comprises determining, based at least in part on packet label information of the header of the one data packet, whether to forward the one data packet to the second stage filter portion of the receiver device or to discard the one data packet as not being intended for the receiver device, and forwarding or discarding the packet accordingly, and wherein, when the start field indicates that the one data packet does not comprise the start fragment of the PDU, the method further comprises forwarding the one data packet to the second stage filter portion of the receiver device.

2. The data packet filtering method of claim 1, wherein the determination whether to forward the one data packet to the second stage filter portion of the receiver or to discard the one data packet as not being intended for the receiver device comprises:

determining whether the header of the one data packet includes a label field; and when the header of the one data packet includes the label field, determining whether the label field comprises an approved label, and wherein the method comprises forwarding the one data packet to the second stage filter portion when it is determined that the label field comprises an approved label, and discarding the one data packet when it is determined that the label field does not comprise an approved label, and wherein, when the header of the one data packet does not include the label field, the method comprises forwarding the one data packet to the second stage filter portion.

3. The data packet filtering method of claim 1, wherein the determination whether to forward the one data packet to the second stage filter portion of the receiver or to discard the one data packet as not being intended for the receiver device comprises:

parsing the header of the one data packet to locate a label type (LT) field, wherein the LT field indicates whether the one data packet includes a label field;

determining whether the LT field indicates that the one data packet includes a label field; and when it is determined that the one data packet includes the label field, determining whether the label field comprises an approved label, and wherein the method comprises forwarding the one data packet to the second stage filter portion when it is determined that the label field comprises an approved label, and discarding the one data packet when it is determined that the label field does not comprise an approved label.

4. The data packet filtering method of claim 3, wherein the LT field further indicates whether the one data packet comprises a label reuse case, and wherein the determination whether to forward the one data packet to the second stage filter portion of the receiver or to discard the one data packet as not being intended for the receiver device further comprises:

determining whether the LT field indicates that the one data packet comprises the label reuse case; and when it is determined that the one data packet comprises the label reuse case, determining whether a prior label field comprised an approved label; and wherein the method comprises forwarding the one data packet to the second stage filter portion when it is determined that the prior label field comprised an approved label, and discarding the one data packet when it is determined that the prior label field did not comprise an approved label.

5. The data packet filtering method of claim 3, wherein the LT field further indicates whether the one data packet comprises a fragment from a broadcast PDU, and wherein the determination whether to forward the one data packet to the second stage filter portion of the receiver or to discard the one data packet as not being intended for the receiver device further comprises:

determining whether the LT field indicates that the one data packet comprises a fragment from a broadcast PDU; and wherein, when it is determined that the one data packet comprises the fragment from the broadcast PDU, the method comprises forwarding the one data packet to the second stage filter portion.

6. The data packet filtering method of claim 3, wherein the LT field further indicates whether the one data packet comprises a packet from a broadcast PDU and whether the one data packet comprises a label reuse case, and wherein the determination whether to forward the one data packet to the second stage filter portion of the receiver or to discard the one data packet as not being intended for the receiver device further comprises:

determining whether the LT field indicates that the one data packet comprises a packet from a broadcast PDU, and wherein, when it is determined that the one data packet comprises the packet from the broadcast PDU, the method comprises forwarding the one data packet to the second stage filter portion; and determining whether the LT field indicates that the one data packet comprises the label reuse case, and, when it is determined that the one data packet comprises the label reuse case, determining whether a prior label field comprised an approved label, and wherein the method comprises forwarding the one data packet to the second stage filter portion when it is determined that the prior label field comprised an approved label, and discarding the one data packet when it is determined that the prior label field did not comprise an approved label.

7. The data packet filtering method of claim 1, wherein the fragments of the PDU are encapsulated in the data frame in accordance with Generic Stream Encapsulation (GSE) protocol.

8. The data packet filtering method of claim 1, wherein the first stage filter portion operates at a relatively substantial higher speed than the second stage filter portion.

9. The data packet filtering method of claim 1, wherein the first stage filter portion is implemented in a hardware module, comprising one or more of discrete integrated circuit logic components, a programmable gate array, an application specific integrated circuit (ASIC), and firmware.

10. A communications terminal apparatus comprising:

a receiver configured to receive a signal transmitted over a wireless channel;

a demodulator and a decoder configured to respectively demodulate and decode the received signal to recover a plurality of data frames, each comprising one or more data packets representing one or more respective encapsulated fragments of a packet data unit (PDU); and a first stage filter portion and a second stage filter portion, wherein the first stage filter portion is configured to filter received data packets in order to reduce processing loads of the second stage filter portion, and wherein the first stage filter portion comprises:

a parser configured to parse a header of a one of the data packets to locate a start field, wherein the start field indicates whether the one data packet comprises a start fragment of the PDU;

a first comparator configured to determine whether the start field indicates that the one data packet comprises a start fragment of the PDU; and a packet filter, wherein, when the first comparator determines that the start field indicates that the one data packet comprises the start fragment of the PDU, the packet filter is configured, based at least in part on packet label information of the header of the one data packet, to forward the one data packet to the second stage filter portion or to discard the one data packet as not being intended for the communications terminal apparatus, and wherein, when the first comparator determines that the start field indicates that the one data packet does not comprise the start fragment of the PDU, the packet filter is configured to forward the one data packet to the second stage filter portion.

11. The communications terminal apparatus of claim 10, wherein the first comparator is further configured to determine whether the header of the one data packet includes a label field, and wherein:

when the first comparator determines that the header of the one data packet includes the label field, the first comparator is further configured to determine whether the label field comprises an approved label, and wherein the packet filter is configured to forward the one data packet to the second stage filter portion when it is determined that the label field comprises an approved label, and to discard the one data packet as not being intended for the communications terminal apparatus when it is determined that the label field does not comprise an approved label; and when the first comparator determines that the header of the one data packet does not include the label field, the packet filter is configured to forward the one data packet to the second stage filter portion.

12. The communications terminal apparatus of claim 10, wherein the parser is further configured to parse the header of the one data packet to locate a label type (LT) field, wherein the LT field indicates whether the one data packet includes a label field, and wherein the apparatus further comprises:
- a second comparator configured to determine whether the LT field indicates that the one data packet includes a label field; and
- a third comparator configured to, when the second comparator determines that the one data packet includes the label field, determine whether the label field comprises an approved label, and
- wherein the packet filter is configured to forward the one data packet to the second stage filter portion when it is determined that the label field comprises an approved label, and to discard the packet as not being intended for the communications terminal apparatus when it is determined that the label field does not comprise an approved label.

13. The communications terminal apparatus of claim 12, wherein the LT field further indicates whether the one data packet comprises a label reuse case, and the second comparator is further configured to determine whether the LT field indicates that the one data packet comprises the label reuse case:
- wherein, when it is determined that the one data packet comprises the label reuse case, the third comparator is further configured to determine whether a prior label field comprised an approved label; and
- wherein the packet filter is configured to forward the one data packet to the second stage filter portion when it is determined that the prior label field comprised an approved label, and to discard the one data packet as not being intended for the communications terminal apparatus when it is determined that the label field does not comprise an approved label.

14. The communications terminal apparatus of claim 12, wherein the LT field further indicates whether the one data packet comprises a fragment from a broadcast PDU, and the second comparator is further configured to determine whether the LT field indicates that the one data packet comprises a fragment from the broadcast PDU, and wherein, when it is determined that the one data packet comprises the fragment from the broadcast PDU, the packet filter is configured to forward the one data packet to the second stage filter portion.

15. The communications terminal apparatus of claim 12, wherein the LT field further indicates whether the one data packet comprises a packet from a broadcast PDU and whether the one data packet comprises a label reuse case, and wherein the second comparator is further configured to determine whether the LT field indicates that the one data packet comprises a packet from a broadcast PDU and whether the one data packet comprises the label reuse case, and wherein:

when it is determined that the one data packet comprises a packet from the broadcast PDU, the packet filter is configured to forward the one data packet to the second stage filter portion; and when it is determined that the one data packet comprises the label reuse case, the third comparator is further configured to determine whether a prior label field comprised an approved label, and wherein the packet filter is configured to forward the one data packet to the second stage filter portion when it is determined that the prior label field comprised an approved label, and to discard the one data packet as not being intended for the communications terminal apparatus when it is determined that the prior label field did not comprise an approved label.

16. The communications terminal apparatus of claim 10, wherein the fragments of the PDU are encapsulated in the data frame in accordance with Generic Stream Encapsulation (GSE) protocol.

17. The communications terminal apparatus of claim 10, wherein the first stage filter portion operates at a relatively substantial higher speed than the second stage filter portion.

18. The communications terminal apparatus of claim 10, wherein the first stage filter portion is implemented in a hardware module, comprising one or more of discrete integrated circuit logic components, a programmable gate array, an application specific integrated circuit (ASIC), and firmware.

19. The communications terminal apparatus of claim 10, wherein the parser is further configured to parse the header of the one data packet to locate a label type (LT) field, and the comparator is further configured to determine a logic value of the LT field, wherein the logic value of the LT field indicates whether the one data packet comprises a packet from a broadcast PDU, whether the one data packet includes a label field, and whether the one data packet comprises a label reuse case, and wherein:

when the comparator determines that the LT field indicates that the one data packet comprises a packet from the broadcast PDU, the filter is configured to forward the one data packet to the second stage filter portion;

when the comparator determines that the LT field indicates that the one data packet includes the label field, the filter is configured to forward the one data packet to the second stage filter portion when the label field comprises an approved label; and when the comparator determines that the LT field indicates that the one data packet comprises the label reuse case, the comparator is configured to determine whether a prior label field comprised an approved label, and the filter is configured to forward the one data packet to the second stage filter portion when the label field comprises an approved label, and to discard the one data packet as not being intended for the communications terminal apparatus when the label field does not comprise an approved label.

20. A communications terminal apparatus, comprising:
- a receiver configured to receive a signal transmitted over a wireless channel;
- a demodulator and a decoder configured to respectively demodulate and decode the received signal to recover a plurality of data frames, each comprising one or more data packets representing one or more respective encapsulated fragments of a packet data unit (PDU); and
- a first stage filter portion configured to preprocess the data packets; and a second stage filter portion configured to further process certain of the data packets forwarded to it by the first stage filter portion; and wherein the preprocessing of the data packets by the first stage filter portion comprises determining whether the data packets are intended for the communications terminal apparatus, and filtering out certain of the data packets when it is determined that such data packets are not intended for receipt by the terminal apparatus in order to reduce processing loads of the second stage filter portion; and wherein the first stage filter portion comprises:
  a parser configured to parse the data frame to locate a start of a one of the data packets, and to parse a header of the one data packet to locate a start field; and
  a comparator configured to determine a logic value of the start field, wherein the logic value of the start field indicates whether the one data packet comprises a start fragment of the PDU; and
  a filter, wherein:
    when the comparator determines that the start field indicates that the one data packet comprises the start fragment of the PDU, the filter is configured to determine, based at least in part on packet label information of the header of the one data packet, whether to forward the one data packet to the second stage filter portion or to discard the one data packet as not being intended for the communications terminal apparatus, and to forward or discard the data packet accordingly; and
    when the comparator determines that the start field indicates that the one data packet does not comprise the start fragment of the PDU, the filter is configured to forward the one data packet to the second stage filter portion.

21. The communications terminal apparatus of claim 20, wherein the fragments of the PDU are encapsulated in the data frame in accordance with Generic Stream Encapsulation (GSE) protocol.

22. The communications terminal apparatus of claim 20, wherein the first stage filter portion operates at a relatively substantial higher speed than the second stage filter portion.

23. The communications terminal apparatus of claim 20, wherein the first stage filter portion is implemented as a hardware module, comprising one or more of discrete integrated circuit logic components, a programmable gate array, an application specific integrated circuit (ASIC), and firmware, and the second stage filter portion is implemented as a software module.

* * * * *